US008610587B2

(12) United States Patent  (10) Patent No.: US 8,610,587 B2
Tropper  (45) Date of Patent: Dec. 17, 2013

(54) STAND ALONE SMOKE DETECTOR UNIT WITH SMS MESSAGING

(76) Inventor: Dovid Tropper, Fresh Meadows, NY (US)

( * ) Notice: Subject to any disclaimer, the term of this patent is extended or adjusted under 35 U.S.C. 154(b) by 273 days.

(21) Appl. No.: 13/112,649

(22) Filed: May 20, 2011

(65) Prior Publication Data

US 2012/0295567 A1    Nov. 22, 2012

(51) Int. Cl.
  *G08B 17/10*  (2006.01)
(52) U.S. Cl.
  USPC ..... 340/628; 340/531; 340/539.1; 340/693.6; D10/106.2; 455/404.1; 379/37; 379/40; 379/90.01
(58) Field of Classification Search
  USPC ........... 340/531, 539, 628, 693.6; D10/106.2; 455/404.1; 379/37, 40, 90.01
  See application file for complete search history.

(56) References Cited

U.S. PATENT DOCUMENTS

| | | | |
|---|---|---|---|
| 4,027,302 A | 5/1977 | Healey | |
| 5,365,568 A | 11/1994 | Gilbert | |
| 6,160,487 A * | 12/2000 | DeLuca | 340/693.7 |
| 6,313,744 B1 * | 11/2001 | Capowski et al. | 340/514 |
| 6,441,731 B1 * | 8/2002 | Hess | 340/539.26 |
| 6,490,487 B1 * | 12/2002 | Kraus et al. | 607/60 |
| 7,019,646 B1 | 3/2006 | Woodard | |
| 7,148,797 B2 * | 12/2006 | Albert | 340/521 |
| 7,319,403 B2 * | 1/2008 | Woodard et al. | 340/632 |
| 7,557,701 B2 * | 7/2009 | Numazaki | 340/506 |
| 7,567,174 B2 * | 7/2009 | Woodard et al. | 340/539.26 |
| 7,642,924 B2 * | 1/2010 | Andres et al. | 340/628 |
| 8,180,374 B2 * | 5/2012 | Kramarz-Von Kohout | 455/456.2 |
| 8,232,884 B2 * | 7/2012 | Pattok et al. | 340/628 |
| 2004/0030355 A1 * | 2/2004 | Schiller et al. | 607/5 |
| 2004/0176081 A1 * | 9/2004 | Bryham et al. | 455/414.1 |
| 2005/0021840 A1 * | 1/2005 | Niemi | 709/238 |
| 2008/0070546 A1 * | 3/2008 | Lee | 455/404.2 |
| 2009/0063187 A1 * | 3/2009 | Johnson et al. | 705/2 |
| 2009/0096620 A1 * | 4/2009 | Kuo | 340/628 |
| 2009/0140848 A1 * | 6/2009 | Rollins et al. | 340/521 |
| 2010/0080363 A1 * | 4/2010 | Lesher et al. | 379/88.19 |
| 2010/0093381 A1 * | 4/2010 | Maguire | 455/466 |
| 2010/0222031 A1 * | 9/2010 | Carolan et al. | 455/414.1 |

FOREIGN PATENT DOCUMENTS

| | | | |
|---|---|---|---|
| GB | 2409559 A | | 6/2005 |
| GB | 2413883 A | * | 11/2005 |
| WO | 2006012460 A1 | | 2/2006 |
| WO | 2011001131 A1 | | 1/2011 |

* cited by examiner

*Primary Examiner* — Hai Phan
*Assistant Examiner* — Zhen Wu
(74) *Attorney, Agent, or Firm* — Hess Patent Law Firm LLC; Robert J. Hess

(57) ABSTRACT

A smoke detector unit with built-in global system for mobile communications (GSM) to effect short message service (SMS) with an end user, and short message service (SMS), data transmission or email, with a central station monitoring (CSM) Events such as low battery condition and excessive smoke detection are reported to the CSM or end user via SMS or email. The unit may be reprogrammed via SMS remotely. The unit may be checked for connectivity between the unit and the CSM or end user via SMS remotely.

19 Claims, 2 Drawing Sheets

STAND ALONE SMOKE DETECTOR UNIT WITH SMS MESSAGING

FEDERALLY SPONSORED RESEARCH

Not applicable.

SEQUENCE LISTING OR PROGRAM

Not applicable.

BACKGROUND OF THE INVENTION

1. Field of the invention

The present invention relates to a stand alone smoke detector unit with a GSM/Cellular module inside to report an alarm via a SMS message to pre-set phone numbers or SMS message, data transmission or email via contact ID format to a central monitoring receiver upon detection of a smoke concentration condition that exceeds a threshold or preset reference value.

2. Discussion of Related Art

GSM is an acronym for Global System for Mobile Communications, originally Groupe Special Mobile. SMS is an acronym for short message service.

U.S. Pat. No. 7,019,646 entitled "Combination smoke alarm and wireless location device" relates to a smoke alarm interfaced with a wireless transceiver, which operates over an existing wireless telecommunications network. The wireless transceiver can be a cellular processor with an integrated memory for storing emergency identification data. Upon sensing the presence of smoke, the wireless transceiver automatically transmits stored emergency identification data signals to a dispatch center. The latest technology allows the wireless transceiver to contain a fully integrated "system on a chip." In one embodiment, the wireless transceiver is of a dual-band and/or dual-mode configuration (e.g., GSM/GPRS) to optimize voice communications, text messaging (i.e., Short Message Service ("SMS")), and Multi-Media Service ("MMS"), and contain on-chip memory capabilities. Further, Personal Digital Assistants ("PDA's") include wireless transceivers. PDA's may also integrate wireless local-area network ("W-LAN") modules for wireless data communications with other PDA's or personal computers.

U.S. Pat. No. 7,319,403 entitled "Combination carbon monoxide and wireless E-911 location alarm" is directed at a self-contained carbon monoxide alarm interfaced with a cellular transceiver, which operates in existing wireless E-911 location systems. The cellular transceiver is a cellular processor with integrated memory for storing emergency identification data for automated carbon monoxide emergency incident reporting to 911 public safety answering point operators. Upon sensing the presence of carbon monoxide, the cellular transceiver automatically initiates a 911 emergency call, transmitting emergency identification information over a wireless E-911 location system to a 911 public safety answering point operator, who dispatches public safety personnel to the location of the emergency carbon monoxide incident. The cellular transceiver circuitry may be configured to utilize wireless data transfer protocols such as SMS, CDPD, GPRS, CDMA, or other wireless data transfer or wireless air interface protocols configured to operate in cellular or PCS networks and wireless E-911 location systems. The cellular transceiver circuitry may further include programming to automatically or manually execute a self-diagnostic routine that verifies the operational status of the transceiver signal, power, and other critical cellular transceiver functions.

U.S. Pat. No. 7,567,174 is directed at a wireless alarm device includes a smoke alarm interfaced with a wireless transceiver, configured to operate over a plurality of existing wireless telecommunications and position location networks. The wireless transceiver can be a cellular processor comprising multiple radio frequency bands and air interface standards with an integrated memory for storing emergency identification information. Upon sensing the presence of smoke, the wireless transceiver automatically transmits stored emergency identification information signals and a geographic location of the wireless alarm device to a dispatch center. The wireless transceiver configured to utilize more than one mobile telephone RF bands, one or more mobile telephone air interface standards (e.g. CDMA, GSM, AMPS, TDMA), and/or utilize wireless data transfer protocols (e.g. SMS, CDPD, GPRS) configured to operate in cellular or PCS networks and wireless E911 location systems. The wireless communication and position location circuitry may further comprise programming to automatically or manually execute a diagnostic routine that verifies the operational status of transceiver signals, power, and other critical functions.

It is desired to remotely alter contact identification information of a standalone smoke detector having SMS messaging capability and to alter an SMS header of a standalone smoke detector having SMS messaging capability.

SUMMARY OF THE INVENTION

One aspect of the invention relates to a standalone smoke detector with a GSM/Cellular module inside to report an alarm via a SMS message to pre-set phone numbers or SMS message, data transmission or email via with contact ID format to a central monitoring receiver upon detection of a smoke concentration condition that exceeds a threshold or preset reference value.

A further aspect adds an SMS header with every SMS alarm message reported by the GSM module via the pre-set phone numbers for easy recognition.

Another aspect changes the contact ID format and/or the SMS header in response to receipt of instructions sent remotely to do so.

A further aspect resides in transmitting a further message via an alternative messaging service (other than SMS) in response to passage of a time period after transmission of the message via SMS, but provided the GSM module fails to receive an acknowledgement of receipt during the passage of the time period.

BRIEF DESCRIPTION OF THE DRAWING

For a better understanding of the present invention, reference is made to the following description and accompanying drawings, while the scope of the invention is set forth in the appended claims.

DETAILED DESCRIPTION OF THE INVENTION

Figure 1:
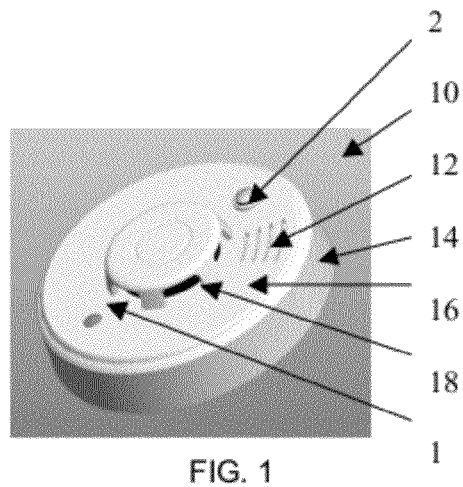
FIG. 1 shows an isometric view of a smoke detector in accordance with the invention.

Turning to FIG. 1, a stand alone smoke detector unit 10 is shown with a GSM module inside to report an alarm via a SMS message to pre-set phone numbers or SMS message with contact ID format to a central station monitoring (CSM) receiver upon detection of a smoke concentration condition that exceeds a threshold or preset reference value.

The construction of the unit 10 involves inserting a cellular module into a custom plastic body that houses the smoke detector and circuit board. The circuit board has firmware that controls the cellular module. The firmware programs the cellular module to send predetermined SMS messages based on specific events such as, low battery, smoke detection, manual disarm and self test.

The unit 10 can be set to communicate with central station monitoring (CSM) via contact id-special language for central station, or direct to end user via standard SMS.

FIG. 1 shows the unit 10 having a base 14 and a plastic cover 16. The cover has openings that accommodate a red/green LED 1 and a protruding test button 2 and a series of spaced apart ports 18 leading to the optical chamber of the unit to allow smoke to reach an optical detector within the optical chamber, and a further series of openings 12 over a speaker so an alarm/buzzer can be heard nearby when the alarm/buzzer is actuated due to smoke detection or low battery. The optical detector is a light sensor. When used as a smoke detector, it includes a light source (incandescent bulb or infrared LED), a lens to collimate the light into a beam, and a photodiode or other photoelectric sensor at an angle to the beam as a light detector. In the absence of smoke, the light passes in front of the detector in a straight line. When smoke enters the optical chamber across the path of the light beam, some light is scattered by the smoke particles, directing it at the sensor and thus triggering the alarm.

Figure 2:
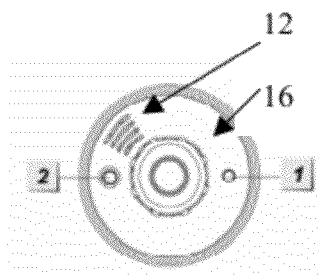
FIG. 2 shows a schematic top view of the cover of the smoke detector of FIG. 1.
Figure 3:
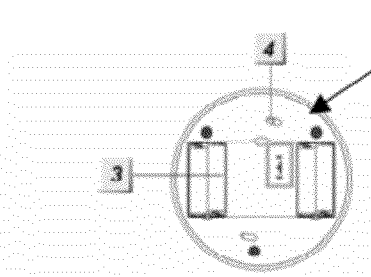
FIG. 3 shows a schematic top view of the smoke detector of FIG. 1, but with the cover taken away to show internals.
Figure 4:
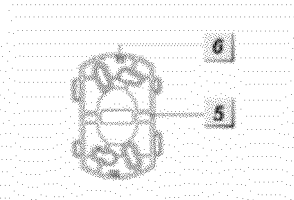
FIG. 4 shows a bottom view of a mounting bracket of the smoke detector of FIGS. 1-3.
Figure 5:
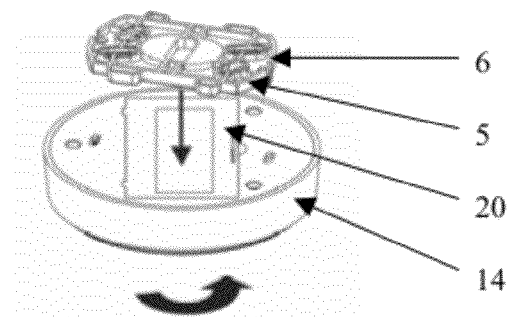
FIG. 5 shows an isometric view of securing the mounting bracket of FIG. 4 to the smoke detector of FIGS. 1-3.

Turning to FIG. 2, the plastic cover 16 of the unit is shown with an opening for the red/green LED 1 to illuminate and a further opening that provides access to the protruding a test button 2. FIG. 3 shows the base of the unit a battery compartment 3 and a mounting hole 4. FIG. 4 shows a mounting bracket 5 with hook 6. FIG. 5 illustrates the manner of inserting the bracket 5 with hook 6 into the base 14 to secure the unit to a ceiling or wall.

When the battery voltage is low, the red LED flashes every 30 seconds. While the batteries are inserted and the smoke detector is in warming and calibration process, the red LED will flash for 8-22 minutes. When the unit is in the reporting or programming mode, the green LED will flash quickly.

The test button is pressed in the following situations:
   SMS programming mode—press and hold the test button over 5 seconds until the LED starts flashing slowly, such as 0.5 seconds on/0.5 seconds off.
   Reset the reference value—press and hold the test button over 10 seconds until the LED starts flashing quickly, e.g., 5 times per second.
   To test for normal functioning of the smoke detector
   To silence the alarm.
   The battery compartment 3 holds four "AA" alkaline batteries to supply power to the unit. Thus, there is no dependence upon the availability of outside sources of electrical power.

When all the batteries are inserted into the battery compartment in the correct polarity orientation, i.e., matching that marked on the battery holder, the unit sounds two short beeps and the LED starts flashing. The unit undergoes a six-minute warm-up period, which ends as one short beep sounds that signifies the start of the calibration process.

The calibration process is repeated every 100 seconds and sounds a beep at the beginning of each calibration cycle. When the calibration process ends (after 2-16 minutes elapse) and the calibration ended successfully, a two tone beep sounds and the LED turns off. Otherwise, the unit sounds continuous beeps instead, which signify that the calibration process was unsuccessful. Removing the batteries with silence the beeping and the entire procedure should be repeated after waiting at least 30 seconds.

Insert a SIM card into the SIM holder 20 (FIG. 5). Press and hold the test button 2 (FIGS. 1 and 2) over five seconds until the LED starts flashing (such as 0.5 seconds on/0.5 seconds off), which indicates that the unit enters the programming mode. The SIM card is a Subscriber Identity Module card is a portable, exchangeable, memory chip used in some models of cellular telephones.

Functions for the unit 10 may be set with programming commands. The following programming command table is illustrative of the programming commands that may be set:

| CHARACTER COMMANDS | COMMAND OPERATION | TERMINATOR | DEFAULT |
|---|---|---|---|
| *10 | Set Master PIN code (4 digits, 0000~9999) (The code can't delete) | * | 1111 |
| *1A | Set SMS P-Word (15 characters) | * | PROG |
| *1C | Set SMS Header (64 characters) | * | ALARM SD-911 |
| *31 | Set SMS Telephone number 1 Set Text: 0 + TEL (20 digits) Set SCID: 4 + Account No.(4 digits, 0000~9999) + TEL (20 digits) Delete the number (no digit) | * | No number |
| *32 | Set SMS Telephone number 2 Set Text: 0 + TEL (20 digits) Set SCID: 4 + Account No.(4 digits, 0000~9999) + TEL (20 digits) Delete the number (no digit) | * | No number |
| *33 | Set SMS Telephone number 3 Set Text: 0 + TEL (20 digits) Set SCID: 4 + Account No.(4 digits, 0000~9999) + TEL (20 digits) Delete the number (no digit) | * | No number |
| *34 | Set SMS Telephone number 4 Set Text: 0 + TEL (20 digits) | * | No number |

-continued

| CHARACTER COMMANDS | COMMAND OPERATION | TERMINATOR | DEFAULT |
|---|---|---|---|
| *38 | Set SCID: 4 + Account No.(4 digits, 0000~9999) + TEL (20 digits) Delete the number (no digit) GSM Call Back: Replaced number (6 digits) + * + substitute number (6 digits) PS; via SMS, where '*' is space, ex: *38 46 0* | * | No number |
| *39 | SCID reach: 0: one of the TEL 1~4 (if set SCID) 1: all the TEL1~4 (if set SCID) | * | 1 (all) |
| *98 | Load defaults (4 digits, 2580) | * | |

Example (note that "_" signifies a space)
1. Set Regaling Telephone Number 8 Method:
   Conditions: P-Word is "PROG", Master Code is "1111", TEL-1 is "0911907086", TEL-2 is "0911907085"
   To set TEL-1 for SMS (Text): PROG_1111_*31_0_0911907086*
   To set TEL-2 for SMS (CID): PROG_1111_*32_4_5678_0911901085*
2. GSM Call Back:
   Conditions: telephone number includes a country code as "+46911907086", the telephone number excludes a country code
   To replace the country code to formal format: PROG_1111_*38_46_0*
   To set TEL-2 for SMS (CID): PROG_1111_*38_*

Turning to FIG. 5, use the mounting bracket 5 as a template to drill two holes in the exact location that the unit is to be mounted and insert dowels into the drilled holes. Screw the mounting bracket 5 on with the two hooks 6 facing down by using the screws and screwing them into the dowels. Locate the single line mark on the unit and line it up with one of the hooks of the bracket. After both hooks fit in the two mounting holes on the detector, rotate the detector counter-clockwise to lock it in onto the bracket. The installation is complete.

By pressing the test button 2 (FIGS. 1-2), normal functioning of the unit can be tested. If the test result is normal functioning, then the LED will be on for two seconds and then it will sound a 2-tone beep. If the buzzer sounds three times of a 2-tone beep, then such signifies that the optical chamber of the unit is either dirty or out-of-order. If the LED doesn't light and no beep is sounded, then the unit is out-of-order.

Once the detected concentration of smoke from the surrounding environment exceeds a set threshold value set in the unit, the unit lights up its LED to indicate that the unit is sending a smoke alarm signal to a control panel. After the transmission is completed, the unit then activates its buzzer with the LED flashing rapidly for 10 seconds for local warning of the detected excessive smoke concentration. After this 10-second local warning period ends, the unit performs a follow-up smoke check. If the smoke concentration is found to exceed the threshold value set in the unit, then the unit repeats another 10 seconds of local warning with the buzzer sounding and the LED rapidly flashing. The unit continues to perform follow-up checks and will sound the alarm/buzzer every two minutes until the smoke concentration level that is detected is lower than the set threshold value.

Upon making such a determination that the smoke concentration level is lower than the set threshold value of the unit, then the alarm/buzzer stops automatically in response to such a determination or can be stopped manually by using the alarm silence function.

The alarm silence function arises when the test button 2 is pressed to place the unit in alarm silence mode for ten minutes during which time the alarm is silenced and the LED flashes once per second. After the 10 minute time period that the alarm/buzzer is in alarm silence mode, the LED flashes once per second. The unit then returns to normal operational mode and sounds a beep. If the smoke concentration level is excessive relative to the set threshold, the unit sounds the warning alarm again.

The programming commands are as follows:
Programming Command
1. Command 10: Master Pin Code
   The Master Code has the authorization to enter the SMS programming mode. Factory default: 1111.
2. Command 1A: SMS Program Keyword
   SMS Program keyword is a password to authorize SMS Remote Programming Setting. Factory Default: PROG.
3. Command 1C: SMS Header
   This command allows you to set a SMS header with every SMS alarm message reported to your mobile phone for easy recognition.
4. Command 31: Telephone Number 1
   This command allows you to set the first telephone number for SMS reporting.
5. Command 32: Telephone Number 2
   This command allows you to set the first telephone number for SMS reporting.
6. Command 33: Telephone Number 3
   This command allows you to set the first telephone number for SMS reporting.
7. Command 34: Telephone Number 4
   This command allows you to set the first telephone number for SMS reporting.
8. Command 38: GSM Call Back
   Before setting this, please place a SMS Remote Command to SD-911 for testing purpose. If the SMS reporting message is received successfully, please skip this section. Otherwise, please use this command to exclude the country code.
   The Phone Number Format for each SIM card may vary by different Telecom companies. Thus, you can either check with your telecom provider and then use this command to change the phone number into the correct format.

EXAMPLE

With the phone number 0987654321, the format should either INCLUDE or EXCLUDE Country Code, which is "886" for the example below:

| INCLUDE | |
|---|---|
| Country Code EXCLUDE | +886987654321 |
| Country Code | 0987654321 |

9. Command 39: SCID Reach
   This command allows you to set one of preset phone numbers for alarm reporting or all of preset phone numbers for alarm reporting.
10. Command 98: Load Default
    This command allows you to set this unit back to factory default.

The unit has the following features:
Built-in GSM antenna. Normally the GSM powers off, but when in alarm, the GSM powers on.
Built-in GSM dialer—CID format over SMS reporting to CMS.
Automatic self-testing report. The setting is by SMS to CMS (CID format).
A reflective photoelectric sensor is employed for detecting excessive smoke concentrations.
Low battery detection and reporting to CMS via SMS
Supervision—the unit sends a predetermined automatic verification of connectivity to CSM via SMS contact ID format
Diagnostic function by pressing a test button 2 for self-test, which includes an optical sensor diagnosis and LED light detecting low battery action, with reporting to CSM via SMS
Alarm silence function: 10 minutes per activation.
Built-in siren for audio alert
Alarm volume: 95 dB@1 meter
GSM band: 800/900/1800/1900 factory pre-set.

Figure 6:
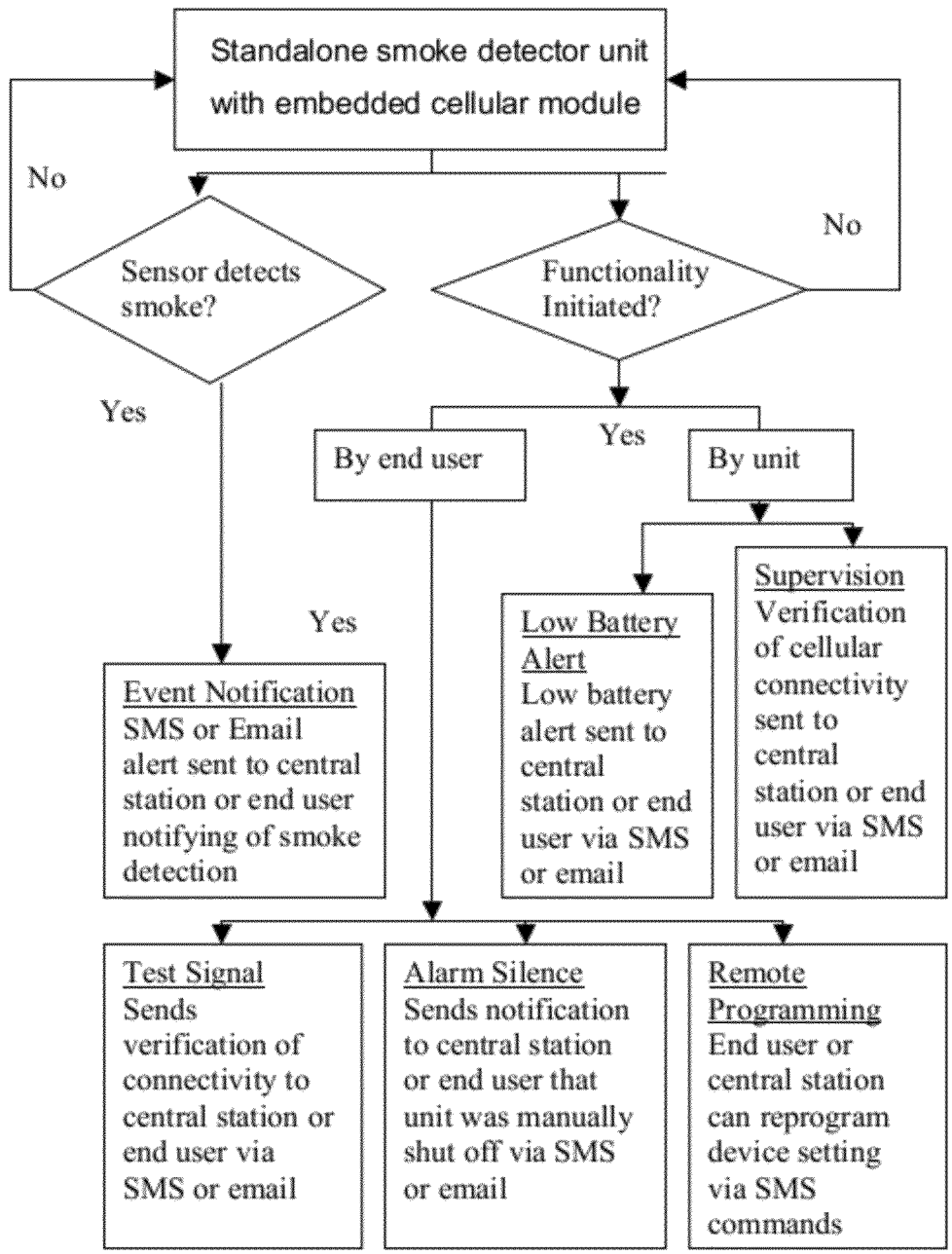
FIG. 6 shows a flow diagram of the operation of the smoke detector of FIGS. 1-5.

Turning to FIG. 6, a flow chart is shown that sets forth the manner of operation of the unit in accordance with the invention. The unit may undertake two operative states. The first state arises from checking for an excessive smoke concentration condition. The second state arises from initiating functionality of the unit, whether by the end user or by the unit itself or by the central monitoring station (or end user) remotely.

The first state is analogous to the functionality of conventional smoke detectors in detecting an excessive smoke concentration (i.e., in excess of an reference threshold value). Upon such a detection, an alarm is sounded by the unit in a manner analogous to conventional smoke detectors. However, in accordance with the invention, the detection also results in making a notification of the detected condition in an SMS message to the central monitoring station (CMS).

The second state has two possible conditions. The first involves the end user initiating the functionality and the second involves the unit initiating functionality.

In the case of the end user initiating the functionality, there are three possibilities. The first involves testing for connectivity with the CMS or the end user by issuing an SMS message or email. The second involves notifying of the silencing of the alarm. Such notification takes place by an SMS message or email. The third involves remote programming of the unit in response to receipt of SMS commands sent from the CMS or end user.

In the case of the unit initiating the connectivity, there are two possibilities. One concerns reporting a low battery power condition for the unit and the other concerns transmitting an acknowledgement to signify connectivity with the CMS or end user.

While the foregoing description and drawings represent the preferred embodiments of the present invention, it will be understood that various changes and modifications may be made without departing from the scope of the present invention.

What is claimed is:

1. A device to report an alarm condition, comprising:
   a housing;
   a detector within the housing, the detector being configured and arranged to detect a concentration that exceeds a threshold value and to generate an alarm condition signal indicative of an alarm condition in which the detected concentration exceeds the threshold value; and
   a global system for mobile communications (GSM) module within the housing, the GSM module being configured and arranged to report the alarm condition via a short message service (SMS) as a message containing a selection from a group consisting of a contact identification (ID) format and an SMS header, the detector and the GSM module being configured and arranged so that the detector transmits the generated alarm condition signal to the GSM module;
   means for detecting a diminished power level that is less than a full power level for powering the GSM module;
   power level detector means for generating a further signal indicative of the detected diminished power level, the GSM module being configured to receive the generated further signal for transmitting a corresponding signal via the SMS; and
   setting means within the housing that is responsive to receipt of remotely sent instructions via the SMS to change a setting of at least one of the contact ID format and the SMS header by replacing the at least one of the contact ID format and the SMS header with a substitute.

2. The device of claim 1, wherein the GSM module is configured and arranged to receive an acknowledgement of receipt of the message via the SMS and to transmit the message again via an alternative messaging service in response to passage of a time period after transmitting the message via the SMS provided the acknowledgement of receipt signal fails to be received during the passage of the time period.

3. The device of claim 1, wherein the housing contains batteries to power the GSM module.

4. The device of claim 3, wherein said power level detector means constitutes means for detecting battery power of the batteries reaching the diminished power level that is less than the full power and generating a low battery signal indicative of the battery power reaching the diminished power level as the generated further signal.

5. The device of claim 1, wherein the GSM module is programmable, further comprising an illumination circuitry that includes a light emitting diode (LED), alarm sound circuitry that includes a speaker, the alarm sound circuitry being configured to initiate an alarm sound through the speaker upon detection of the concentration exceeding the threshold value and the illumination circuitry being configured to trigger illumination of the LED in a particular color to flash, the illumination circuitry also being configured to trigger illumination of the LED in a color different from the particular color during programming of the GSM by sending signals via the SMS.

6. The device of claim 1, further comprising an illumination circuitry that includes a light emitting diode (LED), alarm sound circuitry that includes a speaker, the alarm sound circuitry being configured to initiate an alarm sound through the speaker upon detection of the concentration exceeding the threshold value and the illumination circuitry being configured to trigger illumination of the LED in a particular color to flash, the alarm circuitry including an alarm shut off switch accessible from outside the housing by a user to silence the alarm sound upon actuation of the alarm shut off switch by the user, the GSM module being responsive to the actuation of the shut off switch to report the silencing of the alarm sound from actuation of the alarm shut off switch in a message via the SMS.

7. The device of claim 1, wherein the GSM module transmits a signal via the SMS in response to an incoming signal to confirm connectivity.

8. The device of claim 1, wherein the housing retains inside a subscriber identify module (SIM) card that interacts with the GSM module.

9. The device of claim 1, wherein the detector is a smoke detector that detects the concentration that exceeds the threshold value, the concentration that is detected being that of smoke.

10. A method of readying a device to report an alarm condition, comprising:
- arranging within a housing a detector that detects a concentration that exceeds a threshold value and generates an alarm condition signal indicative of an alarm condition in which the detected concentration exceeds the threshold value;
- arranging within the housing a global system for mobile communications (GSM) module that reports the alarm condition via a short message service (SMS) as a message containing a selection from a group consisting of a contact identification (ID) format and an SMS header, the detector transmitting the generated alarm condition signal to the GSM module;
- detecting a diminished power level that is less than the full power level for powering the GSM module;
- generating a further signal indicative of the detected diminished power level, the GSM module being responsive to the generated further signal for transmitting a corresponding signal via the SMS; and
- changing a setting of at least one of the contact ID format and the SMS header of the GSM module in response to receipt via the SMS of remotely sent instructions by replacing the at least one of the contact ID format and the SMS header with a substitute.

11. The method of claim 10, further comprising transmitting a message via the SMS and transmitting the message via an alternative messaging service in response to passage of a time period after transmitting the message via the SMS provided an acknowledgement of receipt signal fails to be received during the passage of time period.

12. The method of claim 10, further comprising powering the GSM module with batteries within the housing.

13. The method of claim 10, further comprising arranging an illumination circuitry within the housing that includes a light emitting diode (LED), arranging an alarm sound circuitry within the housing that includes a speaker, the alarm sound circuitry being configured to initiate an alarm sound through the speaker upon detection of the concentration exceeding the threshold value and the illumination circuitry being configured to trigger illumination of the LED in a particular color to flash, programming the GSM module, triggering illumination of the LED by the illumination circuitry in a color different from the particular color during the programming of the GSM module by sending signals via the SMS.

14. The method of claim 10, further comprising arranging an illumination circuitry within the housing that includes a light emitting diode (LED), arranging alarm sound circuitry within the housing that includes a speaker, the alarm sound circuitry being configured to initiate an alarm sound through the speaker upon detection of the concentration exceeding the threshold value and the illumination circuitry being configured to trigger illumination of the LED in a particular color to flash, the alarm circuitry including an alarm shut off switch accessible from outside the housing by a user to silence the alarm sound upon actuation of the alarm shut off switch by the user, the GSM module being responsive to the actuation of the shut off switch to report the silencing of the alarm sound from actuation of the alarm shut off switch in a message via the SMS.

15. The method of claim 10, further comprising transmitting a signal from the GSM module via the SMS in response to an incoming signal to confirm connectivity.

16. The method of claim 10, further comprising holding by a holder within the housing a subscriber identify module (SIM) card that interacts with the GSM module.

17. The method of claim 10, wherein the detecting detects battery power reaching the diminished power level that is less than full power, the generated further signal constituting a low battery signal indicative of the battery power reaching the diminished power level.

18. The method of claim 10, further comprising inserting a mount bracket within the housing and securing the housing to a ceiling and locking the housing to the mount bracket by rotating the housing relative to the mount bracket.

19. The method of claim 10, wherein the detector is a smoke detector that detects the concentration that exceeds the threshold value, the concentration that is detected being that of smoke.

* * * * *